(12) United States Patent
Brown et al.

(10) Patent No.: US 6,539,612 B2
(45) Date of Patent: Apr. 1, 2003

(54) METHOD OF MANUFACTURING AN AUTOMOTIVE AIRBAG ENCLOSURE WITH AN EMBEDDED HEATING ELEMENT

(75) Inventors: Joseph Robert Brown, Grosse Ile, MI (US); Marshall Lawrence Quade, Pinckney, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 2 days.

(21) Appl. No.: 09/681,927

(22) Filed: Jun. 27, 2001

(65) Prior Publication Data

US 2003/0000072 A1 Jan. 2, 2003

(51) Int. Cl.[7] .................................................. H05B 3/00
(52) U.S. Cl. ...................... 29/611; 280/728.3; 280/732
(58) Field of Search ................. 29/611, 557; 280/728.3, 280/732; 83/171; 219/121.67

(56) References Cited

U.S. PATENT DOCUMENTS

| | | | |
|---|---|---|---|
| 5,372,379 A | * | 12/1994 | Parker ........................ 165/41 |
| 5,538,280 A | * | 7/1996 | Gray et al. ............... 280/743.1 |
| 5,797,619 A | * | 8/1998 | Bauer et al. ............... 280/728.3 |
| 5,851,026 A | * | 12/1998 | Schoos et al. .............. 280/732 |
| 5,883,356 A | | 3/1999 | Bauer et al. |
| 5,961,143 A | | 10/1999 | Hlywka et al. |
| 6,042,139 A | | 3/2000 | Knox |
| 6,070,901 A | * | 6/2000 | Hazell et al. ............. 280/728.3 |
| 6,092,835 A | | 7/2000 | Thakore et al. |
| 6,106,003 A | | 8/2000 | Rahmstorf et al. |

* cited by examiner

Primary Examiner—Gregory M. Vidovich
Assistant Examiner—Stephen Kenny
(74) Attorney, Agent, or Firm—Gary A. Smith

(57) ABSTRACT

An automotive instrument panel (IP) has a thermostatically controlled electric heating element for maintaining the plastic material of the IP at a temperature warm enough to inhibit brittle fracture during deployment of an airbag mounted within the IP. The heating element is formed by depositing a layer of electrically conductive material on an inner surface of the outermost layer of the IP along the perimeter of an airbag deployment path, bonding the outermost layer to a substrate, and using a laser to simultaneously score the IP around the deployment path and cut the conductive layer so that it forms a circuit through which electric current may be passed for resistance heating.

17 Claims, 3 Drawing Sheets

METHOD OF MANUFACTURING AN AUTOMOTIVE AIRBAG ENCLOSURE WITH AN EMBEDDED HEATING ELEMENT

BACKGROUND OF INVENTION

The present invention relates to a method of manufacturing an enclosure for an automotive passenger restraint airbag. More particularly, the present invention relates to a method of forming an electric heating element in or on the enclosure.

U.S. Pat. No. 6,070,901 teaches a method of manufacturing an automotive instrument panel (IP) wherein a laser is used to score the IP in order to form an invisible seam around an airbag deployment opening in the IP. The laser is directed from a position adjacent the inner surface of the multi-layer IP and cuts through all but the outermost layer of the IP to form a fracturable airbag deployment path that offers minimal resistance to deployment of the airbag.

A consideration in the design of IPs and other types of airbag enclosures is the fact that many plastic materials from which these structures are typically formed tend to become brittle at low temperatures. For proper functioning of the airbag, it is necessary that the portion of the enclosure covering the airbag and through which it deploys be formed of a material that will remain suitably soft and ductile throughout a broad range of ambient operating temperatures. This consideration results in the ruling out of many plastics that, because of other desirable characteristics, might otherwise be appropriate for use.

U.S. Pat. No. 5,372,379 teaches an automotive IP having a thermostatically controlled electric heater disposed adjacent a deployment plate or opening, the heater maintaining the structure adjacent the airbag at a desired minimum temperature. The heater eliminates the need to select an IP covering material that does not become unduly brittle at low temperatures, thus reducing the number of compromises that must be made during the design of the IP.

SUMMARY OF INVENTION

The present invention is directed to an improved and simplified method of manufacturing an automotive airbag enclosure, such as an instrument panel (IP), having an opening for deployment therethrough of an airbag and an electric heating element disposed adjacent the opening for protecting against brittle fracture of the enclosure during deployment of the airbag. The method is adapted for use with a process for forming a seamless airbag cover wherein a laser is used to score a multi-layer IP construction from the inside, cutting completely through all but the outermost layer covering the airbag prior to deployment.

According to a first aspect of the invention, the method comprises the steps of forming a layer of an airbag enclosure having outer and inner surfaces, providing an electrically conductive strip adjacent the inner surface of the layer to define at least a portion of a perimeter of the airbag opening, and directing a high intensity light beam toward the strip to completely penetrate the strip. The laser divides the strip into two parallel conductive paths, whereby the strip may be supplied with electric current and serve as the electrical heating element.

The invention may be easily manufactured because the covering, conductive strip, plate, foam and substrate are all assembled prior to forming an aperture in the substrate.

These and other advantages of the present invention will become more apparent in the course of the following detailed description and appended claims. The invention may best be understood with reference to the accompanying drawings wherein illustrative embodiments are shown.

DETAILED DESCRIPTION

Figure 1:
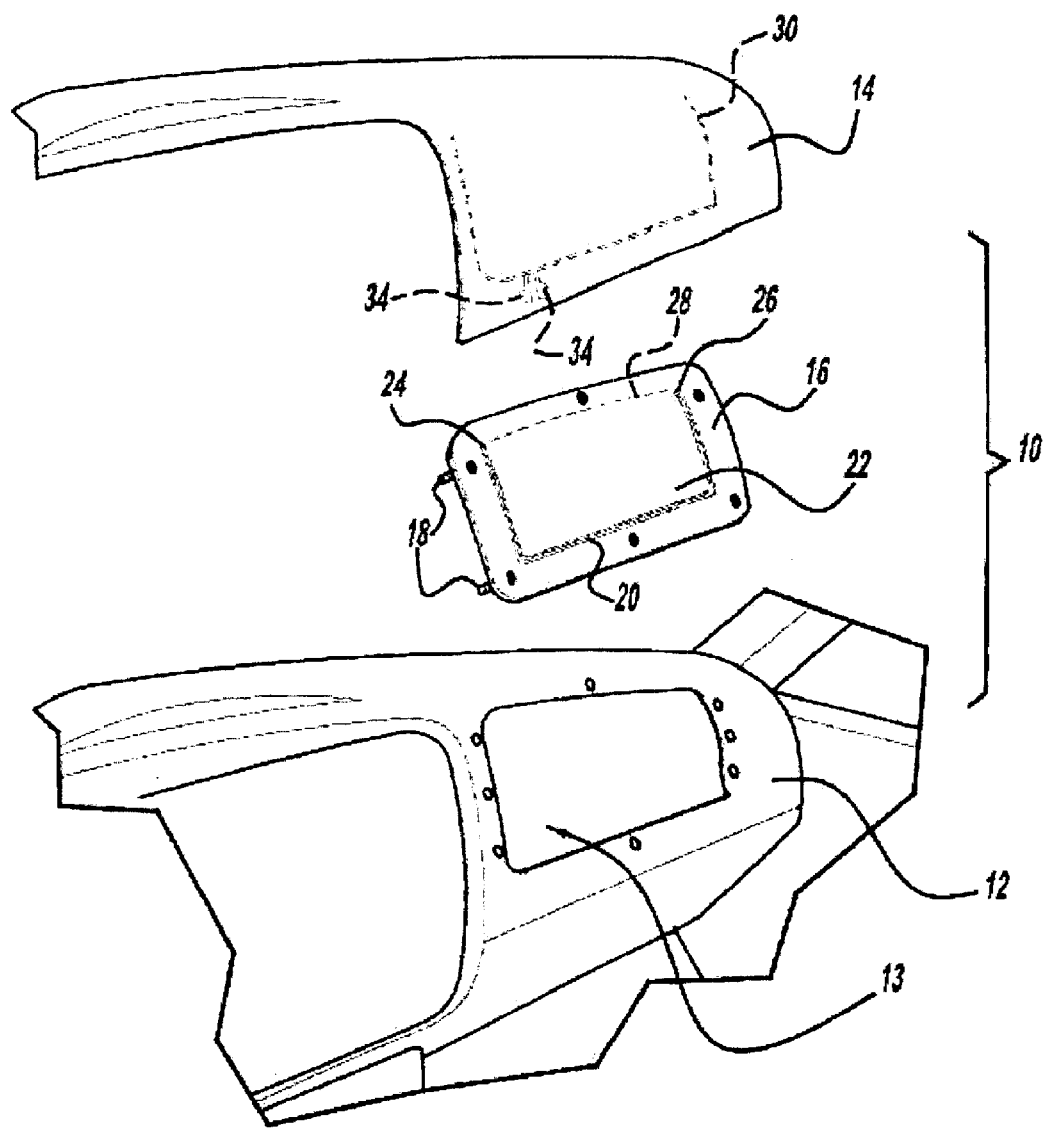
FIG. 1 is an exploded perspective view of an instrument panel prior to laser scoring.
Figure 2:
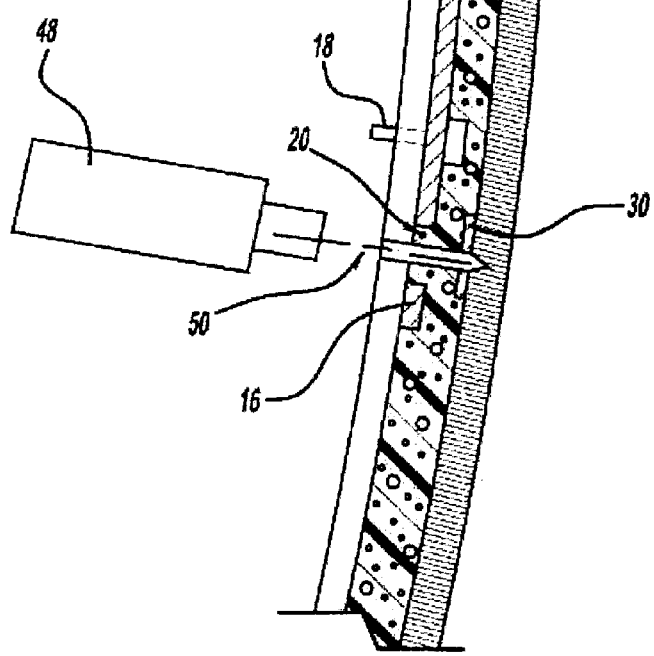
FIG. 2 is a cross-sectional view of the instrument panel undergoing laser scoring.
Figure 3:
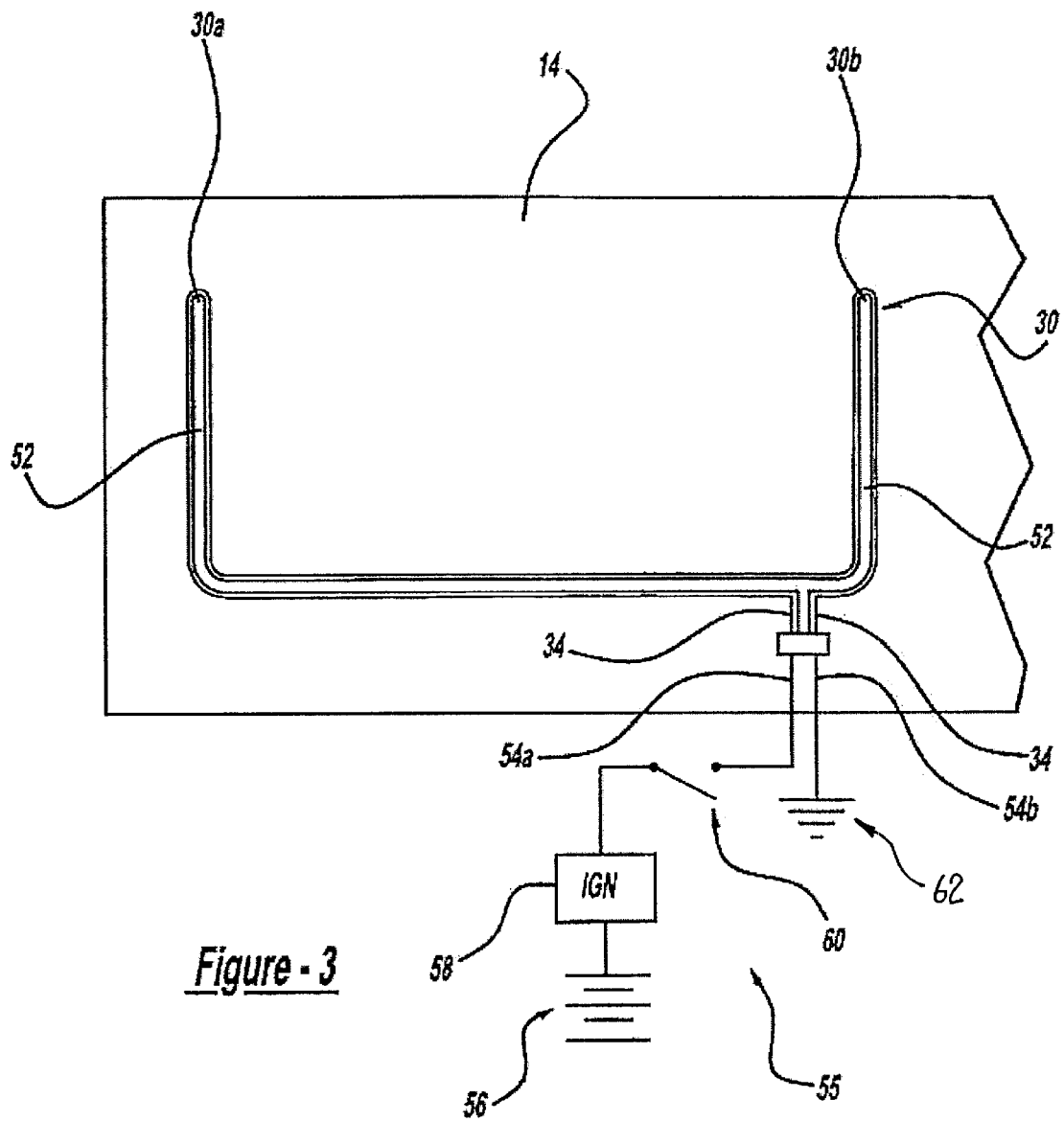
FIG. 3 is a view of the an instrument panel covering showing a heating element formed by the invention process.

A preferred embodiment of the invention as illustrated in FIGS. 1, 2 and 3 teaches a method of manufacturing an instrument panel 10 having a concealed airbag (not shown) located therein in a position to protect an occupant of the passenger seat (not shown) against frontal impact. The depicted embodiment is generally similar to the instrument panel disclosed in U.S. Pat. No. 6,070,901, the disclosure of which is incorporated herein in its entirety.

FIG. 1 is an exploded perspective view of an automotive instrument panel 10 generally comprising a plastic molded substrate 12 and a molded flexible covering 14. The substrate 12 has a generally rectangular opening 13 therein and is formed in the usual manner of injection molding from materials selected to be durable, lightweight and low-cost. Suitable materials for the substrate 12 include polyolefin. Especially preferred is polystyrene or styrene malaeic anhydride (SMA). The covering 14 is pre-molded in the final desired shape for attachment to the substrate 12. Suitable materials for the covering 14 include thermoplastic olefins. Especially preferred are thermoplastic urethanes, polyvinyl chlorides (PVC) or PVC-urethane blends. A variety of methods are known for molding the flexible covering including slush molding, thermoform molding, vacuum molding and injection molding.

A steel plate 16 is generally rectangular and is slightly curved to match the contours of the substrate 12 in the vicinity of the opening 13. The plate 16 has a generally U-shaped slot 20 having a first end 24 and a second end 26 and defining a flap 22 in the center of the plate. The plate 16 is preferably manufactured from relatively soft (low carbon) steel that offers little resistance to bending so that the flap 22 may fold along a folding axis 28 when the force of the deploying airbag is applied against the flap 22. A plurality of fasteners 18 are welded or otherwise secured to the plate 16 at points around its perimeter.

An electrically conductive strip 30 is applied to the inner or concave surface of the covering 14. As indicated in FIG. 1, the conductive strip 30 is in the generally shape of a U matching the outline of the slot 20 in plate 16 and has two short stems 34 extending downwardly from the bottom of the U. Conductive strip 30 is preferably copper or a copper alloy and may be applied to the covering 14 by any appropriate process, such as silk-screening.

To assemble the components shown in FIG. 1, the plate 16 is first secured to the substrate by inserting the fasteners 18 through holes in the substrate 12 adjacent the opening 13. The covering 14 is then positioned over the substrate 12 with the two components spaced a fixed distance apart. See FIG. 2. The distance between the covering 14 and the substrate 12 forms a space for receiving a foam 46. Suitable foam materials include polymer foams. Especially useful are polyurethane foams, which demonstrate good adhesion to each of the substrate, covering and plate. When the foam 46 cures, it secures the covering 14 to the substrate 12 and the plate 16.

After the foam 46 had cured, a focused light beam 50 such as that produced by a laser 48 is used to score the instrument panel 10. Laser 48 is positioned adjacent the back surface of substrate 12 and directs light beam 50 onto the substrate at a position aligned with slot 20. The laser passes through the opening 13 in the substrate 12, passes through the slot 20, then cuts through foam 46, and conductive strip 30. Laser 48 moves parallel to the surface of the substrate 12 over a pattern precisely following the slot 20 so that the light beam 50 passes through the slot at all times. The intensity of beam 50 and the rate at which it is moved are carefully controlled such that the beam only partially penetrates the covering 14. Accordingly, the covering 14 is scored from the inside along a path matching the shape of the slot 20 to form an easily fracturable opening path to permit deployment of the airbag, while the outer surface of the covering displayed to the passengers is not visibly marred.

As seen in FIG. 3, the beam 50 cuts conductive strip 30 along its centerline, dividing the strip into two adjacent, parallel conductive paths separated by a narrow gap 52. The beam 50 does not cut all the way to the upper ends 30a, 30b of the strip, but rather leaves the upper ends intact so that the conductive paths are connected to form a continuous circuit terminating at the stems 34. Electric wires 54a, 54b are connected to the stems 34 and to an electrical circuit 55 for providing direct current. An example of a suitable electrical circuit is shown to include wire 54a connected to an electric power source 56, a vehicle ignition switch 58, and a switch 60, and wire 54b connected to ground 62. Switch 60 is preferably a thermostat calibrated to close when the sensed temperature falls below a predetermined minimum. When ignition switch 58 is in a position to supply power to the circuit 55, closing of switch 60 allows current to flow through the strip 30 so that it serves as a heating element to warm the covering layer 14. The heat provided by strip 30 maintains the portion of covering layer 14 adjacent the score line at a temperature warm enough to prevent brittle fracture of the covering layer during deployment of the airbag.

An airbag (not shown) is secured to the under surface of the substrate 12 in a manner well known in the inflatable restraint art, for example by means of the attaching fasteners 18. The instrument panel 10 is installed within a vehicle (not shown). In the event of a collision, the airbag inflates and pushes the flap 22 outwardly as it deploys. The covering 14 fractures along the score line formed by the laser, allowing the desired deployment of the airbag.

The present invention is not limited to an instrument panel or any particular an airbag location or type of enclosure, but rather may be practiced in relation to an airbag located anywhere within the passenger compartment of a vehicle. Examples of other possible airbag types and locations include: a driver airbag located inside a steering wheel assembly; a side airbag located inside a seat; and a side curtain airbag inside a headliner or adjacent a roof rail.

While the best modes for carrying out the invention have been described in detail, those familiar with the art to which this invention relates will recognize various alternative designs and embodiments for practicing the invention as defined by the following claims.

What is claimed is:

1. A method of manufacturing an automotive airbag enclosure having an opening for deployment therethrough of an airbag and an electrical heating element for protecting against brittle fracture of the enclosure during deployment of the airbag, the method comprising the steps of:

forming a layer of the enclosure having outer and inner surfaces;

providing an electrically conductive strip adjacent the inner surface of the layer to define at least a portion of a perimeter of the opening; and directing a high intensity light beam toward the strip to completely penetrate the strip and divide the strip into two adjacent conductive paths, whereby the paths may be supplied with electric current and serve as the electrical heating element.

2. The method according to claim 1 wherein the light beam, after penetrating the strip, partially penetrates the layer to score the inner surface of the layer.

3. The method according to claim 1 wherein the strip is disposed on the inner surface of the layer by a silk-screening process.

4. The method according to claim 1 wherein the layer is an outer covering of the enclosure.

5. The method according to claim 1 wherein the enclosure is an instrument panel.

6. The method according to claim 5 further comprising the step of:

positioning a plate generally parallel with the layer and adjacent the strip such that a slot formed in the plate is aligned with the strip, whereby the light beam passes through the slot before penetrating the strip.

7. The method according to claim 6 wherein the slot is generally U-shaped to define a foldable flap, the line between first and second ends of the slot defining a folding axis for the flap.

8. The method according to claim 6 further comprising the steps of:

prior to directing the light beam toward the strip, securing the plate to a substrate; and injecting a foam between the substrate and the layer, as well as between the plate and the layer, to secure the layer to the substrate and the plate, whereby during the step of directing the light beam toward the strip the light beam completely penetrates the substrate and foam prior to penetrating the strip.

9. A method of manufacturing an automotive airbag enclosure comprising the steps of:

forming a substrate having first and second surfaces;

providing a plate having a generally U-shaped slot formed therein to define a foldable flap, the line between first and second ends of the slot defining a folding axis of the flap;

securing the plate to the second substrate surface;

securing a generally U-shaped, electrically conductive strip to an inner surface of a covering, the strip matching the configuration of the slot in the plate;

positioning the covering generally parallel to and spaced from the plate and the substrate;

injecting a foam between the substrate and the covering, and between the plate and the covering, to secure the covering to the substrate and the plate; and directing a high intensity light beam at the first substrate surface in the area overlying the slot, the light beam passing through an opening in the substrate, and penetrating the foam and the strip and partially penetrating the covering, the light beam passing through the slot in the metal plate and causing the substrate, foam and covering to form a fracturable opening path.

10. The method according to claim 9 wherein the strip is disposed on the inner surface of the layer by a silk-screening process.

11. The method according to claim 9 wherein the enclosure is an instrument panel.

12. A method of manufacturing an automotive airbag enclosure having an electric heating element for protecting against brittle fracturing of the enclosure during deployment of an airbag contained within the enclosure, the method comprising the steps of:

forming a panel comprising a plurality of layers and having an electrically conductive strip disposed adjacent one of the layers;

directing a high intensity light beam toward the panel to at least partially penetrate at least one of the layers and to completely penetrate the strip thereby dividing the strip into two adjacent conductive paths; and attaching wires to the conductive paths, whereby the paths may be supplied with electric current and serve as the electric heating element.

13. The method according to claim 12 wherein the step of forming the panel comprises:

providing a covering having outer and inner surfaces, the strip being disposed on the inner surface;

molding a substrate having first and second surfaces;

positioning the covering generally parallel to and spaced from said second surface of said substrate; and injecting a foam between the substrate and the covering to secure the covering to the substrate, whereby the light beam completely penetrates the substrate, the foam, and the strip and partially penetrates the covering.

14. The method according to claim 13 wherein the step of forming the panel further comprises:

securing a plate to the second substrate surface, the plate having a slot formed therein matching the shape of and aligned with the strip, whereby the light beam passes through the slot before penetrating the strip.

15. The method according to claim 14 wherein the slot is generally U-shaped to define a foldable flap, the line between first and second ends of the slot defining a folding axis of the flap.

16. The method according to claim 12 wherein the strip is disposed on the inner surface of the layer by a silk-screening process.

17. The method according to claim 12 wherein the enclosure is an instrument panel.

* * * * *